US010211676B2

(12) United States Patent
Dwari et al.

(10) Patent No.: US 10,211,676 B2
(45) Date of Patent: Feb. 19, 2019

(54) ELECTROMECHANICAL PROPULSION SYSTEM HAVING A WIRELESS POWER TRANSFER SYSTEM (71) Applicant: OTIS ELEVATOR COMPANY, Farmington, CT (US)

(72) Inventors: Suman Dwari, Vernon, CT (US); Enrico Manes, Feeding Hills, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 234 days.

(21) Appl. No.: 15/245,932

(22) Filed: Aug. 24, 2016

(65) Prior Publication Data
US 2017/0057793 A1 Mar. 2, 2017

Related U.S. Application Data (60) Provisional application No. 62/209,775, filed on Aug. 25, 2015.

(51) Int. Cl.
H02J 50/12 (2016.01)
B66B 11/04 (2006.01)

(52) U.S. Cl.
CPC .......... H02J 50/12 (2016.02); B66B 11/0407 (2013.01)

(58) Field of Classification Search
CPC .............................. H02J 50/12; B66B 11/0407
See application file for complete search history.

(56) References Cited

U.S. PATENT DOCUMENTS

| 6,412,604 | B1 | 7/2002 | Schuster |
| 7,880,337 | B2 | 2/2011 | Farkas |
| 8,008,888 | B2 | 8/2011 | Oyobe et al. |
| 8,111,042 | B2 | 2/2012 | Bennett |
| 8,278,784 | B2 | 10/2012 | Cook et al. |
| 8,917,511 | B2 | 12/2014 | Yamamoto et al. |
| 9,030,052 | B2 | 5/2015 | Kim et al. |
| 9,837,860 | B2 * | 12/2017 | McCarthy ............... H02J 7/025 |
| 2013/0024059 | A1 | 1/2013 | Miller et al. |
| 2013/0062966 | A1 | 3/2013 | Verghese et al. |
| 2013/0069625 | A1 | 3/2013 | Gilchrist et al. |
| 2013/0249299 | A1 | 9/2013 | Shijo et al. |
| 2013/0270919 | A1 | 10/2013 | Miller |

(Continued)

FOREIGN PATENT DOCUMENTS

| WO | WO 2010112675 A2 * | 10/2010 | ............... B66B 7/00 |
| WO | 2012085119 A2 | 6/2012 | |

(Continued)

Primary Examiner — Daniel Cavallari
(74) Attorney, Agent, or Firm — Cantor Colburn LLP (57) ABSTRACT An elevator system includes an elevator car having an electrically powered car subsystem. A guide rail of the elevator system is constructed and arranged to guide the elevator car along a hoistway and in a direction of travel. An electromechanical propulsion system includes plurality of primary windings positioned along the hoistway, and a permanent magnet coupled to the elevator car for imparting motion to the elevator car in response to a drive excitation. A secondary winding is coupled to the elevator car and disposed adjacent to the permanent magnet along the direction of travel, and wherein the secondary winding is configured to utilize an excitation switching frequency ripple to generate a current to power the car subsystem.

22 Claims, 6 Drawing Sheets (56) References Cited

U.S. PATENT DOCUMENTS

2015/0280455 A1\* 10/2015 Bosshard ............... H02J 5/005
    307/104
2016/0285279 A1\* 9/2016 Mehas ................... H02M 7/23

FOREIGN PATENT DOCUMENTS

WO  2014125392 A1  8/2014
WO  2014189492 A1  11/2014

\* cited by examiner

TOTAL EXCITATION CURRENTS

FIG. 5

BASE FREQUENCY AND HIGH FREQUENCY CURRENTS

FIG. 6

FIELD PRODUCED BY HIGH RIPPLES CURRENTS

ELECTROMECHANICAL PROPULSION SYSTEM HAVING A WIRELESS POWER TRANSFER SYSTEM

CROSS-REFERENCE TO RELATED APPLICATION

This application claims priority to U.S. Provisional Patent Application No. 62/209,775, filed Aug. 25, 2015, the entire contents of which is incorporated herein by reference.

BACKGROUND

The present disclosure relates to electromechanical propulsion systems, and more particularly to propulsion systems having wireless power transfer systems.

Electromechanical propulsion systems operate to move a first structure relative to a stationary second structure generally through magnetic levitation. Without tethers, it is difficult to provide on-board power to the moving first structure.

Self-propelled elevator systems, as one non-limiting example, may utilize such magnetic propulsion systems. Such ropeless elevator systems are useful in certain applications (e.g., high rise buildings) where the mass of the ropes for a roped system is prohibitive and/or there is a need for multiple elevator cars in a single hoistway. Elevator cars typically need power for ventilation, lighting systems, operation of doors and brakes, control units, communication units and to recharge batteries installed, for example, on an elevator car controller. Moreover, elevator cars may require back-up systems in case of a power failure. Existing systems use moving cables or current collectors/sliders to connect a moving elevator car with power lines distributed along the elevator hoistway.

SUMMARY

An elevator system according to one, non-limiting, embodiment of the present disclosure includes an elevator car including an electrically powered car subsystem; a guide rail constructed and arranged to guide the elevator car along a hoistway and in a direction of travel; a plurality of primary windings positioned along the hoistway; a permanent magnet coupled to the elevator car, the plurality of primary windings and the permanent magnet defining an electromechanical propulsion system for imparting motion to the elevator car in response to a drive excitation; and a secondary winding coupled to the elevator car and disposed adjacent to the permanent magnet along the direction of travel, and wherein the secondary winding is configured to utilize an excitation switching frequency ripple to generate a current to power the car subsystem.

Additionally to the foregoing embodiment, the secondary winding is induction based.

In the alternative or additionally thereto, in the foregoing embodiment, the secondary winding is resonance based.

In the alternative or additionally thereto, in the foregoing embodiment, the plurality of primary windings include a first winding having a first excitation current and an adjacent second winding having a second excitation current not in phase with the first excitation current, and the first excitation current includes a first base frequency component and a first ripple frequency component, and the second excitation current includes a second base frequency component and a second ripple frequency component, and wherein the first and second base frequency components are associated with the electromechanical propulsion system for imparting motion and the first and second ripple frequency components are associated with the secondary winding and the excitation switching frequency ripple.

In the alternative or additionally thereto, in the foregoing embodiment, a power source; and a converter that receives energy from the power source and outputs the first and second excitation currents to the respective first and second windings, and wherein the first and second ripple frequency components are generated by internal switching of the converter.

In the alternative or additionally thereto, in the foregoing embodiment, the converter outputs the excitation switching frequency ripple in the range of about 5 kHz to 100 kHz, and is greater than a base frequency of the first and second base frequency components.

In the alternative or additionally thereto, in the foregoing embodiment, the secondary winding is constructed and arranged to resonate at the excitation switching frequency ripple.

In the alternative or additionally thereto, in the foregoing embodiment, the excitation switching frequency ripple is substantially greater than a base frequency associated with the electromechanical propulsion system, and the pole pitch of each one of the primary windings is not equal to a pole pitch of the secondary winding.

In the alternative or additionally thereto, in the foregoing embodiment, the electromechanical propulsion system is a linear electromechanical motor.

In the alternative or additionally thereto, in the foregoing embodiment, the electromechanical propulsion system is a rotating electromechanical motor.

In the alternative or additionally thereto, in the foregoing embodiment, the elevator car subsystem includes at least one of a battery, a ventilation unit, a lighting system, door operation unit, brake unit, display unit, a control unit, and a communication unit.

In the alternative or additionally thereto, in the foregoing embodiment, the elevator system includes a controller configured to sequentially control the energization of the plurality of primary windings.

In the alternative or additionally thereto, in the foregoing embodiment, the elevator system is ropeless.

In the alternative or additionally thereto, in the foregoing embodiment, the elevator system includes a power converter disposed in the elevator car and configured to convert the induced voltage and current to suitable AC or DC voltage and current.

A wireless power supply according to another, non-limiting, embodiment includes a plurality of primary windings including a first winding having a first excitation current and an adjacent second winding having a second excitation current, and wherein the first excitation current includes a first base frequency component and a first ripple frequency component, and the second excitation current includes a second base frequency component and a second ripple frequency component; and a secondary winding configured to utilize an excitation switching frequency ripple to generate a current, and wherein and the first and second ripple frequency components are associated with the secondary winding and the excitation switching frequency ripple for wireless power transfer.

Additionally to the foregoing embodiment, the first and second base frequency components are associated with an electromechanical propulsion system for imparting motion.

In the alternative or additionally thereto, in the foregoing embodiment, the electromechanical propulsion system is a rotating electromechanical motor.

In the alternative or additionally thereto, in the foregoing embodiment, the electromechanical propulsion system is a linear electromechanical motor.

In the alternative or additionally thereto, in the foregoing embodiment, the electromechanical propulsion system is a compound motion electromechanical motor In the alternative or additionally thereto, in the foregoing embodiment, the excitation switching frequency ripple is within a range of about 5 kHz to 100 kHz, and is greater than a base frequency of the first and second base frequency components.

In the alternative or additionally thereto, in the foregoing embodiment, the secondary winding is constructed and arranged to resonate at the frequency of the excitation switching ripple.

In the alternative or additionally thereto, in the foregoing embodiment, the wireless power transfer system includes a resonant component configured to receive energy from the secondary winding.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The following patent applications assigned to the same assignee and filed on the same day as the present disclosure are herein incorporated by reference in their entirety (identified via docket numbers: 79766US01 (U320411US); 78887US01 (U320410US); 78800US01 (U320415US); and 77961US01 (U320462US).

Figure 1:
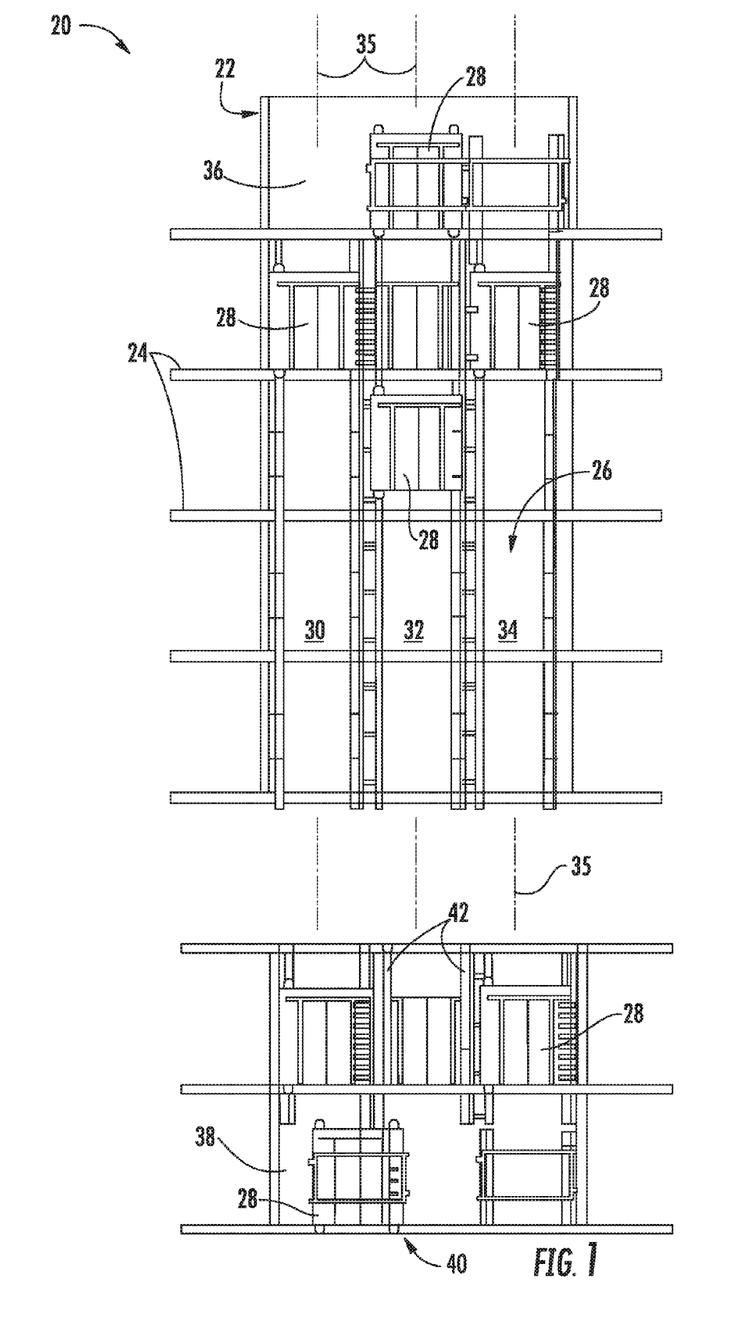
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 having boundaries defined by the structure 22 and at least one car 28 adapted to travel in the hoistway 26. The hoistway 26 may include, for example, three lanes 30, 32, 34 each extending along a respective central axis 35 with any number of cars 28 traveling in any one lane and in any number of travel directions (e.g., up and down). For example and as illustrated, the cars 28 in lanes 30, 34, may travel in an up direction and the cars 28 in lane 32 may travel in a down direction.

Above the top floor 24 may be an upper transfer station 36 that facilitates horizontal motion to elevator cars 28 for moving the cars between lanes 30, 32, 34. Below the first floor 24 may be a lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
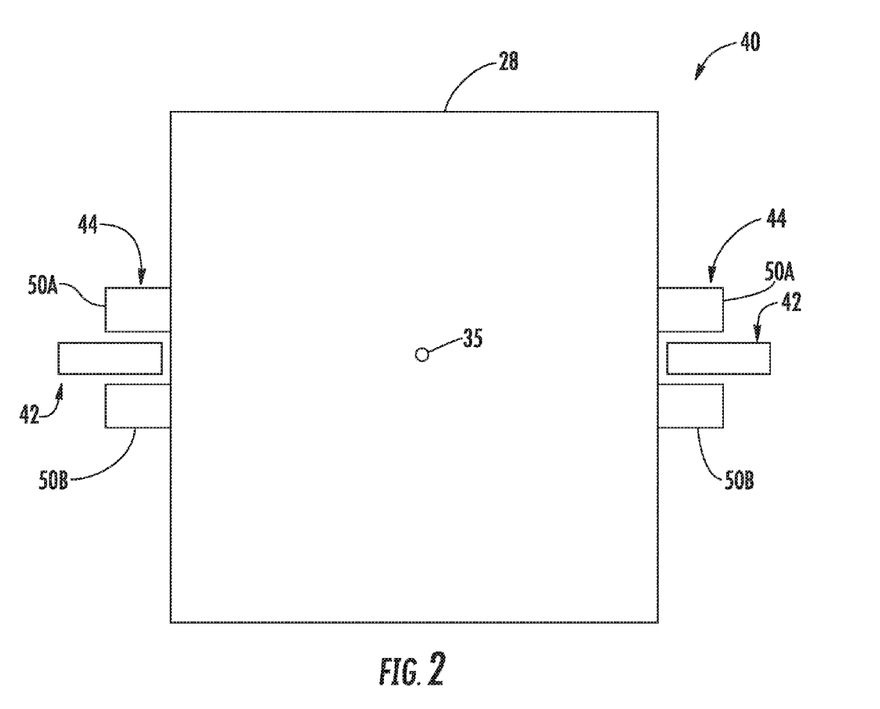
FIG. 2 is a top down view of a car and portions of a linear propulsion system in an exemplary embodiment.
Figure 3:
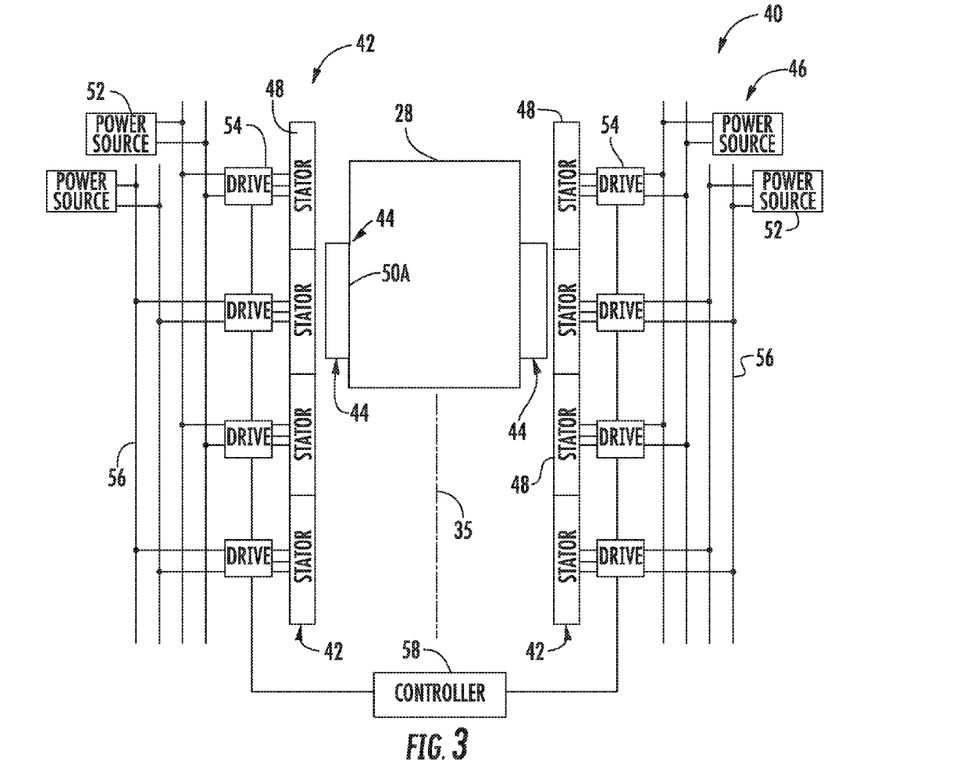
FIG. 3 is a schematic of the linear propulsion system.
Figure 4:
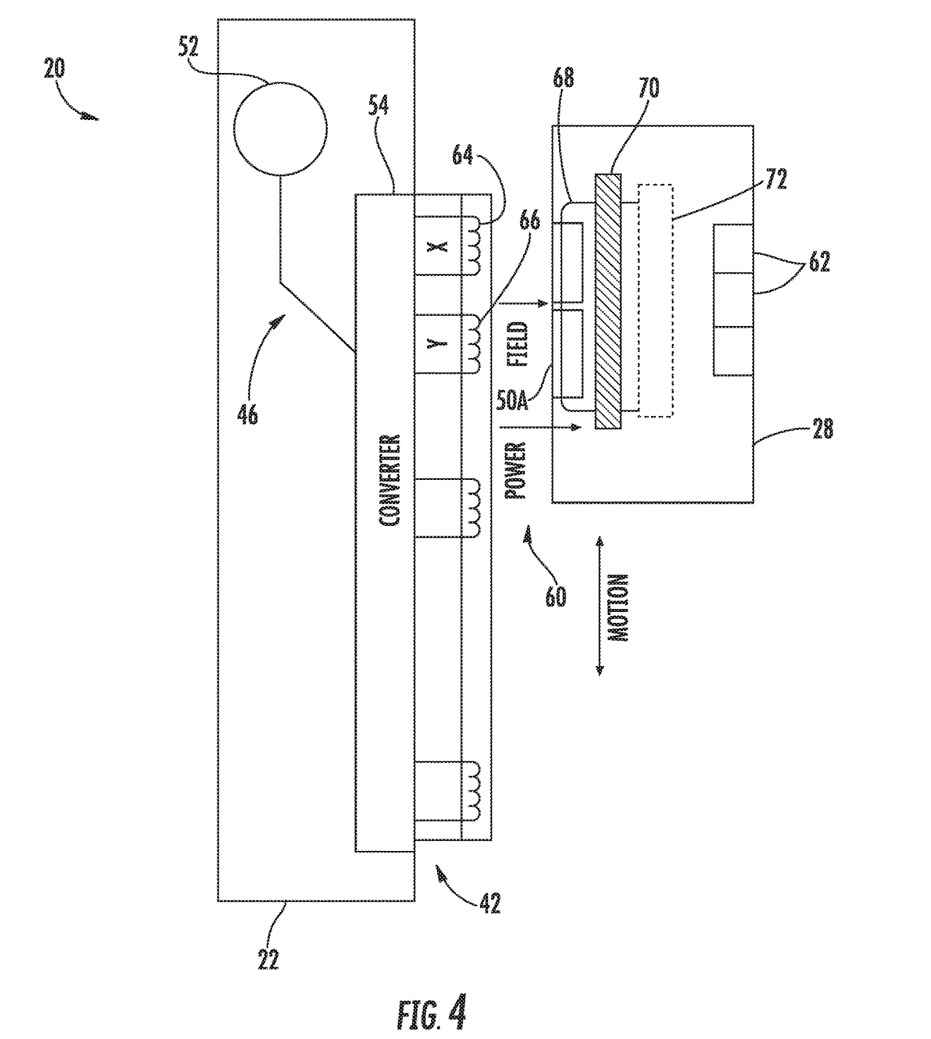
FIG. 4 is a schematic of the elevator system with a wireless power transfer system.

Referring to FIGS. 1 through 3, cars 28 are propelled using a linear propulsion system 40 having at least one, fixed, primary portion 42 (e.g., two illustrated in FIG. 2 mounted on opposite sides of the car 28), moving secondary portions 44 (e.g., two illustrated in FIG. 2 mounted on opposite sides of the car 28), and a control system 46 (see FIG. 4). The primary portion 42 (i.e. stator) includes a plurality of windings 48 mounted at one or both sides of the lanes 30, 32, 34 in the hoistway 26. Each secondary portion 44 may include two rows of opposing permanent magnets 50A, 50B mounted to the car 28. Primary portion 42 is supplied with drive excitations from the control system 46 to generate a magnetic flux that imparts a force on the secondary portions 44 to control movement of the cars 28 in their respective lanes 30, 32, 34 (e.g., moving up, down, or holding still). The plurality of windings 48 of the primary portion 42 are generally located between and spaced from the opposing rows of permanent magnets 50A, 50B. It is contemplated and understood that any number of secondary portions 44 may be mounted to the car 28, and any number of primary portions 42 may be associated with the secondary portions 44 in any number of configurations.

Referring to FIG. 3, the control system 46 may include power sources 52, power converters 54 (e.g. motor or propulsion drives), buses 56 and a controller 58. The power sources 52 are electrically coupled to the power converters 54 via the buses 56. In one non-limiting example, the power sources 52 may be direct current (DC) power sources. DC power sources 52 may be implemented using storage devices (e.g., batteries, capacitors), and may be active devices that condition power from another source (e.g., rectifiers connected to power grid, generators, etc.). The power converters 54 may receive DC or AC power from the buses 56 and may provide drive excitations to the primary portions 42 of the linear propulsion system 40. Each power converter 54 may be a converter that converts DC or AC power from bus 56 to a multiphase (e.g., three phases illustrated in FIG. 3, and two phases illustrated in FIG. 4) drive excitation provided to a respective section of the primary portions 42. The primary portion 42 may be divided into a plurality of modules or sections, with each section associated with a respective power converter 54.

The controller 58 provides control signals to each of the power converters 54 to control generation of the drive excitation. Controller 58 may use pulse width modulation (PWM) control signals to control generation of the drive excitations by the power converters 54. Controller 58 may be implemented using a signal processor-based device programmed to generate the control signals. The controller 58 may be distributed as a part of each drive 54 to generate control signal for corresponding drive. The controller 58 may also be part of an elevator control system or elevator management system. Elements of the control system 46 may be implemented in a single, integrated module, and/or be distributed along the hoistway 26.

Referring to FIG. 4, a wireless power transfer system 60 of the elevator system 20 may be used to power loads or elevator car subsystems 62 in or on the elevator car 28. The power transfer system 60 may be an integral part of the control system 46 thereby sharing various components such as the controller 58 (see FIG. 3), buses 56, power source 52, power converters 54, primary portion(s) 42 and other components. The subsystems 62 may include batteries or energy storage devices, a ventilation unit, a lighting system, a door operation unit, brake unit, display unit, a control unit, a communication unit, and others. The subsystems 62 may be alternating current (AC) loads, such as fans of the ventilation unit and others, utilizing a traditional power frequency such as, for example, about 60 Hz. Alternatively, or in addition thereto, the subsystems 62 may include direct current (DC) loads, such as the display unit. The international patent application WO 2014/189492 published under the Patent Cooperation Treaty on Nov. 27, 2014, filed on May 21, 2013, and assigned to Otis Elevator Company of Farmington, Conn., is herein incorporated by reference in its entirety.

Figure 5:
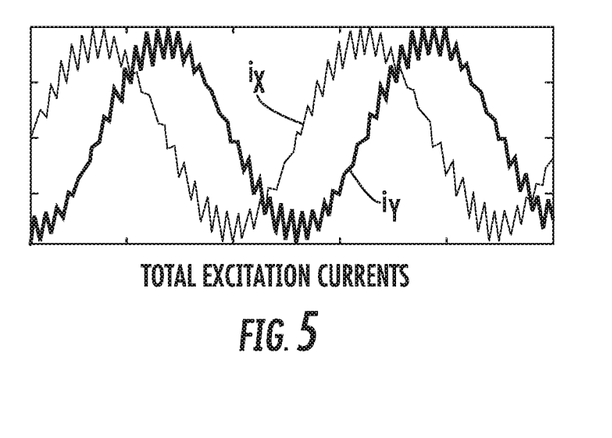
FIG. 5 is a graph of total excitation currents.

Referring to FIGS. 4 and 5, the primary assembly 42 may include a plurality of primary windings 64 at a first phase and a plurality of primary windings 66 at a second phase offset from the first phase. The power converter 54 (e.g. switching power converter controlled with PWM) receives power from the power supply 52 and may convert the power to a predetermined base frequency, voltage, number of phases (two illustrated in FIG. 4) and controlled excitation current of the primary windings 64, 66. The energy from the converter 54 is outputted to the primary windings 64, 66. The total excitation current received by each primary winding 64, 66 is illustrated in FIG. 5. The mechanical propulsion is produced by the low frequency (i.e., base frequency) component of the excitation, which is generally at a low frequency that may be in a range of about 0 Hz to 100 Hz (i.e., wherein 0 Hz may be when the car is held at a stationary position by the excitation of the primary windings).

Figure 6:
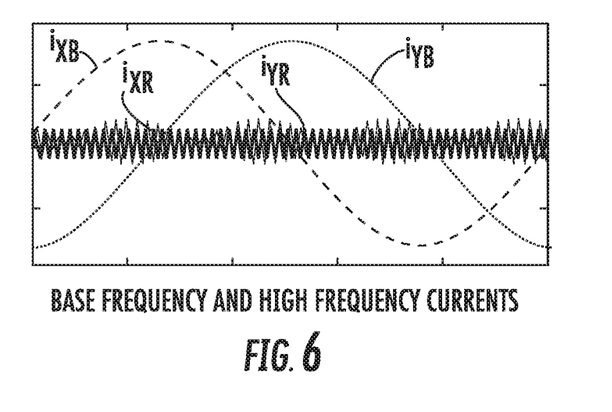
FIG. 6 is a graph of base frequency and switching frequency components of the total excitation currents in FIG. 5.

Generally inherent in the switching power converter 54 is the modulation of switches that may produce switching frequency ripple. The switching frequency ripple components are utilized by the wireless power transfer system 60. More specifically and as best shown in FIG. 6, the total excitation current $(i_x)$ of the winding 64 may be broken down into a base frequency component $(i_{xb})$ at the low base frequency and a ripple or switching frequency component $(i_{xs})$ at a much higher excitation switching frequency (i.e. switching frequency ripple) that may be in a range of about 5 kHz to 100 kHz. Similarly, the total excitation current $(i_y)$ of the winding 66 may be broken down into a base frequency component $(i_{yb})$ at the low frequency and a switching frequency component $(i_{ys})$ at the much higher excitation switching frequency. The base frequency components $(i_{xb})$, $(i_{yb})$ of the respective total excitation currents $(i_x)$, $(i_y)$ may generally be used by the propulsion system 40 to levitate and/or propel the elevator car 28. The switching frequency components $(i_{xs})$, $(i_{ys})$ may be used by the wireless power transfer system 60 to power the elevator car loads 62.

Figure 7:
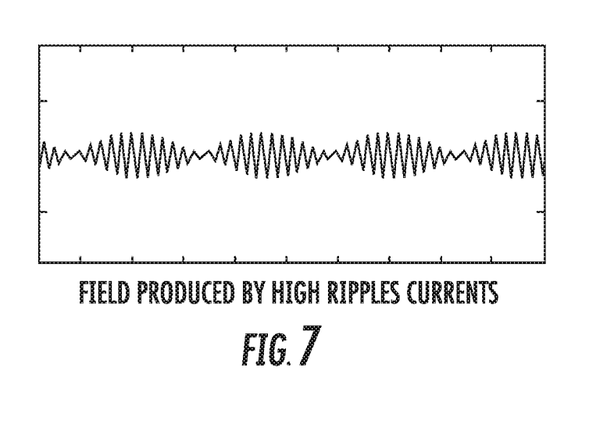
FIG. 7 is a graph of a field produced by the switching frequency components.

Referring to FIG. 7, a graph illustrates the probable resultant field produced by the switching frequency components $(i_{xs})$, $(i_{ys})$.

The wireless power transfer system 60 may further include components generally in or carried by the elevator car 28. Such components may include a secondary winding 68 configured to be induced with a voltage or current when the energized primary windings 64, 66 are proximate thereto, a resonant component 70 that may be active and/or passive, and a power converter 72. The secondary winding 68 may induce a current when the winding is proximate to the energized primary windings 64, 66, and may be induction based, or resonance based constructed to resonate generally at the frequency of the excitation switching ripple or at the harmonic components of the switching frequency ripple. Although not illustrated, the secondary windings 68 may have a pole pitch that is not equal to a pole pitch of the primary windings 64, 66. The secondary windings 68 of the power transfer system 60 may generally wrap about one or both of the permanent magnets 50A, 50B of the secondary portion 44 of the propulsion system 40.

The resonant component 70 receives energy from the secondary winding 68 and may be passive or active. As a passive resonant component 70, the component is generally a capacitor and capable of storing or operating on AC power. As an active resonant component 70, the component 70 is configured to mitigate the effects of a weak or variable coupling factor (i.e., varies when the secondary winding 68 passes the primary windings 64, 66). That is, the resonant component 70 may function to level-out the induced output current and voltage from the secondary winding 68.

The power converter 72 in the elevator car 28 is configured to receive high frequency power from the resonant component 70. The converter 72 may reduce the high frequency power to a suitable low frequency power (e.g., low power frequency of 60 Hz or other) that is compatible with AC loads 62 in the elevator car 28. The converter 72 may further function to convert the high frequency power to DC power, which is then stored in an energy storage device (not illustrated). An example of an energy storage device may be a type of battery.

The ability to induce current in the secondary winding 68 at the high switching frequency (i.e., as oppose to low frequency) may optimize the efficiency of induced power transfer from the primary windings 64, 66 to the secondary winding 68. Moreover, the high switching frequency generally facilitates the reduction in size of many system components such as the secondary winding 68, the resonant component 70 and the converter 72 amongst others. Reducing the size of components improves packaging of the system and may reduce elevator car 28 weight.

The secondary winding 68 may be designed and deployed such that the base frequency components $(i_{xb})$, $(i_{yb})$ do not create any variable field upon the secondary winding, and only the high switching frequency field (i.e. produced by converter switching) produces a varying field across the secondary winding to enable wireless power transfer. The elevator system 20 is highly reliable, safe, and is not limited by the mechanical and electrical limitations of a contact based power transfer system. The elevator system 20 may utilize existing excitation arrangements on the stationary side for the wireless power transfer function. Moreover, the system 20 may utilize the ripple components produced by the switching of the power converter 54 which may already exist in typical systems. The system 20 is relatively simple and robust, and may not require additional switching or modulation of the primary excitation, and additional power converter and winding on the stationary side of the system. The present disclosure may also be utilized for any information exchange between the stationary and moving sides.

Figure 8:
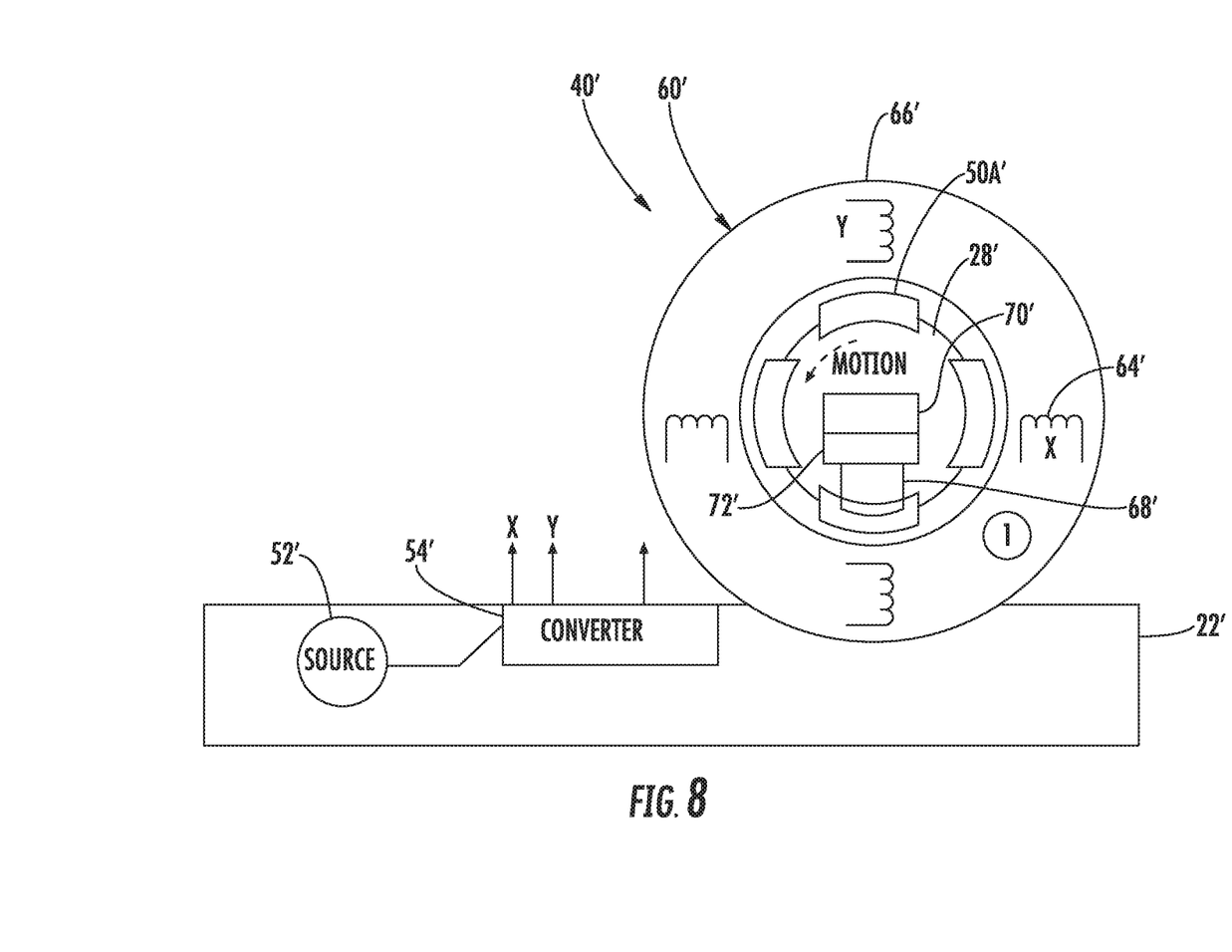
FIG. 8 is a schematic of a second embodiment of a propulsion system with a wireless power transfer system.

Referring to FIG. 8, a second embodiment of a propulsion system is illustrated wherein like components to the first embodiment of like element numbers except with the addition of a prime symbol suffix. A propulsion system 40' may not be linear and instead may be a compound motion electromechanical motor that may include rotation (i.e. rotating motor), or a combination of rotary and linear motion. A wireless power transfer system 60' may be integral to the propulsion system 40'. It is further contemplated and understood that the systems 40', 60' may not be limited to elevators and may be applied to any variety of applications that may require wireless power transfer to a moving structure 28' from a stationary structure 22'.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. An elevator system comprising:
   an elevator car including an electrically powered car subsystem;
   a guide rail constructed and arranged to guide the elevator car along a hoistway and in a direction of travel;
   a plurality of primary windings positioned along the hoistway;
   a permanent magnet coupled to the elevator car, the plurality of primary windings and the permanent magnet defining an electromechanical propulsion system for imparting motion to the elevator car in response to a drive excitation; and
   a secondary winding coupled to the elevator car and disposed adjacent to the permanent magnet along the direction of travel, and wherein the secondary winding is configured to utilize an excitation switching frequency ripple to generate a current to power the car subsystem.

2. The elevator system set forth in claim 1, wherein the secondary winding is induction based.

3. The elevator system set forth in claim 1, wherein the secondary winding is resonance based.

4. The elevator system set forth in claim 1, wherein the plurality of primary windings include a first winding having a first excitation current and an adjacent second winding having a second excitation current not in phase with the first excitation current, and the first excitation current includes a first base frequency component and a first ripple frequency component, and the second excitation current includes a second base frequency component and a second ripple frequency component, and wherein the first and second base frequency components are associated with the electromechanical propulsion system for imparting motion and the first and second ripple frequency components are associated with the secondary winding and the excitation switching frequency ripple.

5. The elevator system set forth in claim 4 further comprising:
   a power source; and
   a converter that receives energy from the power source and outputs the respective first and second excitation currents to the respective first and second windings, and wherein the first and second ripple frequency components are generated by internal switching of the converter.

6. The elevator system set forth in claim 5, wherein the converter outputs the excitation switching frequency ripple in the range of about 5 kHz to 100 kHz, and is greater than a base frequency of the first and second base frequency components.

7. The elevator system set forth in claim 1, wherein the secondary winding is constructed and arranged to resonate at a frequency of excitation switching ripple or at its harmonic components.

8. The elevator system set forth in claim 7, wherein the excitation switching frequency ripple is substantially greater than a base frequency associated with the electromechanical propulsion system, and the pole pitch of each one of the primary windings is not equal to a pole pitch of the secondary winding.

9. The elevator system set forth in claim 1, wherein the electromechanical propulsion system is a linear electromechanical motor.

10. The elevator system set forth in claim 1, wherein the electromechanical propulsion system is a rotating electromechanical motor.

11. The elevator system set forth in claim 1, wherein the elevator car subsystem includes at least one of a battery, a ventilation unit, a lighting system, door operation unit, brake unit, display unit, a control unit, and a communication unit.

12. The elevator system set forth in claim 8 further comprising:
    a controller configured to sequentially control the energization of the plurality of primary windings.

13. The elevator system set forth in claim 1, wherein the elevator system is ropeless.

14. The elevator system set forth in claim 1, further comprising:
    a power converter disposed in the elevator car and configured to convert the induced voltage and current to suitable AC or DC voltage and current.

15. A wireless power supply comprising:
    a plurality of primary windings including a first winding having a first excitation current and an adjacent second winding having a second excitation current, and wherein the first excitation current includes a first base frequency component and a first ripple frequency component, and the second excitation current includes a second base frequency component and a second ripple frequency component; and
    a secondary winding configured to utilize an excitation switching frequency ripple to generate a current, and wherein and the first and second ripple frequency components are associated with the secondary winding and the excitation switching frequency ripple for wireless power transfer.

16. The wireless power supply set forth in claim 15, wherein the first and second base frequency components are associated with an electromechanical propulsion system for imparting motion.

17. The wireless power supply set forth in claim 16, wherein the electromechanical propulsion system is a rotating electromechanical motor.

18. The wireless power supply set forth in claim 16, wherein the electromechanical propulsion system is a linear electromechanical motor.

19. The wireless power supply set forth in claim 16, wherein the electromechanical propulsion system is a compound motion electromechanical motor.

20. The wireless power supply set forth in claim 15, wherein the excitation switching frequency ripple is within a range of about 5 kHz to 100 kHz, and is greater than a base frequency of the first and second base frequency components.

21. The wireless power supply set forth in claim 15, wherein the secondary winding is constructed and arranged to resonate at the frequency of the excitation switching ripple.

22. The wireless power supply set forth in claim 21 further comprising:
    a resonant component configured to receive energy from the secondary winding.

\* \* \* \* \*